United States Patent [19]
Yoon et al.

[11] Patent Number: 5,170,461
[45] Date of Patent: Dec. 8, 1992

[54] POLYMERIC ELECTROOPTIC WAVEGUIDE DEVICES USING A POLYMERIC SUBSTRATE

[75] Inventors: Hyun N. Yoon, New Providence; Frank J. Onorato, Phillipsburg; John P. Riggs, New Providence, all of N.J.

[73] Assignee: Hoechst Celanese Corp., Somerville, N.J.

[21] Appl. No.: 807,037

[22] Filed: Dec. 11, 1991

[51] Int. Cl.$^5$ ............................................. G02B 6/10
[52] U.S. Cl. .................................. 385/130; 385/143; 385/145; 385/122
[58] Field of Search ............................. 385/141–145, 385/14, 129–131

[56] References Cited

U.S. PATENT DOCUMENTS

| | | | |
|---|---|---|---|
| 4,904,037 | 2/1990 | Imoto et al. | 385/14 |
| 5,046,800 | 9/1991 | Blyler, Jr. et al. | 385/145 |
| 5,062,680 | 11/1991 | Imamura et al. | 385/145 |
| 5,106,211 | 4/1992 | Chiang et al. | 385/143 |

Primary Examiner—John D. Lee
Assistant Examiner—John Ngo
Attorney, Agent, or Firm—P. S. Kalyanaraman

[57] ABSTRACT

This invention provides superior electrooptic devices containing an organic polymeric waveguiding medium, and a process of fabricating such devices. The fabrication process utilizes a substantially stress-free organic polymeric substrate on top of which the necessary organic layers are successively deposited. The substrate is so selected that its thermal expansion coefficient is substantially close to that of the cladding layers and of the waveguiding layer.

19 Claims, 1 Drawing Sheet

POLYMERIC ELECTROOPTIC WAVEGUIDE DEVICES USING A POLYMERIC SUBSTRATE

FIELD OF THE INVENTION

This invention is related to the field of integrated optics technology and discloses electrooptic waveguide devices that are fabricated using films of nonlinear optical polymers on polymeric substrates. The substrate and the nonlinear optical polymer films in the devices possess substantially the same thermal expansion coefficient, whereby thermal stresses are avoided during the fabrication and utility of the devices.

BACKGROUND OF THE INVENTION

Electrooptic waveguide devices form an essential component of the emerging field of integrated optics, and are based on the phenomenon of electrooptics. Electrooptics is a property whereby materials change their refractive index upon the application of an electric field. This change in refractive index affects the way the material interacts with light. Electrooptics and electrooptic waveguide devices are described, for example, in *Optical Integrated Circuits*, by H. Nishihara et al. McGraw-Hill Book Company, New York, 1985, and in *Integrated Optics: Theory and Technology*, by R. G. Hunsperger, 2nd edition, Springer-Verlag, New York, 1985.

Electrooptic waveguide devices can be passive waveguide devices or functional waveguide devices. Some passive waveguides are optical beam-dividers, polarizers, and the like. Some functional waveguides are phase modulators, Mach-Zehnder modulators, and the like. Generally, electrooptic waveguides, or optical waveguides in short, consist of a transparent waveguiding core ("guiding layer") surrounded by a layer of transparent materials ("cladding layer"). Several general methods are utilized for the fabrication of optical waveguides.

In one method, optical waveguides are formed by applying a dielectric material to a substrate of lower refractive index.

In another method, optical waveguides are formed by selectively altering the refractive index of a bulk transparent material. One technique involves ion bombardment in which selected regions of different refractive index are provided by generating a molecular disorder pattern in a bulk matrix. In another technique, selected regions of different refractive index are either photo-induced in photo-sensitized polymeric materials such as poly(methyl methacrylate) as described in *Applied Physics Letters*, 16, 486 (1970), or electrically induced by diffusing a different index dopant into a transparent material.

Optical waveguides fabricated in GaAs/AlGa structures by laser-assisted etching have been reported in *Integrated and Guided-Wave Optics*, 1989 Technical Digest Series, 4, 64–67 (Optical Society of America).

Optical waveguides consist of an active guiding layer and a cladding layer as afore-mentioned, and optionally, additional layers. Among these layers, the guiding layer serves the important function of interacting with and affecting the propagation of light. Materials that form the guiding layer have been traditionally inorganic materials such as lithium niobate, potassium dihydrogen phosphate, ammonium dihydrogen phosphate, and the like. These are typically single crystal materials, and lack processing capabilities. In recent years, organic polymeric materials are being reported in increasing numbers that possess good processability due to their ability of being cast as films by well known methods, and can also serve as guiding layers. Such polymers typically possess the property of nonlinear optical activity, and hence are referred to as nonlinear optical polymers.

Nonlinear optical polymers contain nonlinear optical moieties as covalently linked part of polymer chains. Examples of such polymers are described in Nonlinear *Optical Properties of Organic and Polymeric Materials*, ed. D. J. Williams, ACS Symposium Series No. 233, American Chemical Society, Washington, D.C., 1983. The nonlinear optical moiety may be part of the polymer backbone, or it may be appended to the polymer backbone through intervening spacer groups. The latter are referred to as side chain nonlinear optical polymers. EP 89402476.9, for example, discloses nonlinear optical polymers where the nonlinear optical moiety forms part of the polymer backbone. U.S. Pat. Nos. 4,779,961; 4,801,670; 4,808,332; 4,865,430 and 4,913,844 disclose several side chain nonlinear optical polymers.

Nonlinearity of moieties is described in terms of second order nonlinearity, third order nonlinearity, and so on, with the corresponding unit values being referred to as second order nonlinear optical susceptibility, third order nonlinear optical susceptibility, and so on. Nonlinear optical moieties of polymers that are preferred as guiding layers in optical waveguide devices generally must possess acceptable second order nonlinear activity. These moieties are generally made up of conjugated $\pi$-electron systems with an electron donating group such as an amine group, and an electron-acceptor group such as a nitro group forming either end of the conjugated $\pi$-electron system.

Nonlinear optical polymers are generally cast as films on substrates by processes such as spin coating from a solution of the polymer in a solvent, spraying, Langmuir-Blodgett deposition, and the like. The substrate materials employed for electrooptic waveguide devices are generally inorganics such as silicon, GaAs, GaAlAs and the like. Silicon is particularly preferred as substrate material due to its ready availability in wafer form in a well-purified state, and the highly-developed state of its technology in integrated circuit and electronics industries. Wafers from silicon also have the advantage that they can be easily cleaved into minute chips carrying the individual devices.

The fabrication of electrooptic waveguide devices from nonlinear optical polymers, such as, for example, the polymers described in U.S. patents referred to above, typically involves the deposition and curing of a plurality of layers of films on the substrate. A typical polymeric electrooptic waveguide device fabrication comprises, for example, deposition of a polymeric film, a lower electrode layer, a lower cladding layer, active guiding layer, an upper cladding layer, and an upper electrode layer. These layers are successively deposited and cured, thus involving successive heating and cooling operations during the fabrication process. While the nonlinear optical polymers are generally considered to be relatively tough, and able to withstand the thermal energy that is needed to process them, it has been discovered that microscopic mechanical deterioration occurs during the fabrication, including, for example, cracking or crazing in the polymer layer or blistering (delamination) of the polymer layer from the inorganic substrate. Such deterioration has significant deleterious effects on the yields, utility and performance of the devices.

One cause of this problem is the difference in the coefficients of thermal expansion of the polymer material as compared to the substrate material. Due to this mismatch of the thermal expansion coefficients, a thermal stress is developed in the layers during the repeated heating and cooling operations in the fabrication process, thus resulting in the defects mentioned above.

Accordingly, it is an object of this invention to provide electrooptic waveguide devices with substantially reduced thermal stress in them.

It is another object of this invention to provide superior performing electrooptic waveguide devices.

It is a further object of this invention to provide an improved method for the fabrication of polymeric electrooptic waveguide devices.

Other objects and advantages of the present invention shall become apparent from the accompanying description and Examples.

SUMMARY OF THE INVENTION

The present invention provides superior electrooptic waveguide devices by providing a superior method for avoiding the formation of thermal stresses during the fabrication and utility of such devices from nonlinear optical polymers. The invention achieves this by eliminating or substantially reducing the mismatch of thermal expansion coefficients between the substrate and the nonlinear optical polymer layer or layers that go on the substrate. This is done by providing substantially stress-free polymeric substrates which have substantially the same thermal expansion coefficient as the nonlinear optical polymer layer or layers. Due to this close matching of thermal expansion coefficients and the fact that the underlying substrate is substantially stress-free, the polymer layer or layers stay substantially stress-free during the thermal cycles while fabricating or using the device, thus avoiding the mechanical deteriorations discussed above.

The polymeric substrate must be substantially stress-free. Thereby, when the polymer layer, whose thermal expansion coefficient substantially matches that of the substrate, is provided on top of that substrate, the polymer layer too remains substantially stress-free. Since most organic polymers have close values for thermal expansion coefficients, selection of appropriate polymeric substrate materials to match the thermal expansion coefficient of the nonlinear optical polymeric and of any other polymeric layers that are used in the fabrication of the devices is achievable. Thus, on a substantially stress-free polymeric substrate of appropriate thermal expansion coefficient, a film of a suitable nonlinear optical polymer is formed and cured if necessary. Additional layers may be provided, depending on the nature of the intended device. If, for example, the intended device is an electrooptic functional waveguide such as Mach-Zehnder modulator, one may, at first, deposit a metal electrode layer on the substrate, followed by a lower cladding layer, then the guiding layer of a nonlinear optical polymer, an upper cladding layer and an upper metal electrode layer, the cladding and guiding layers being patterned after deposition. If the device is a passive waveguide, for example, one may not need the metal electrode layers in the above configuration.

By providing a substantially stress-free polymeric substrate as the base for the fabrication of electrooptic waveguide device form a nonlinear optical polymer waveguiding layer, with the thermal expansion coefficients of the substrate and the polymer layer substantially matched, the present invention eliminates or substantially reduces the possibilities for thermal stresses. Thus, during the fabrication of devices, employment of heating and cooling cycles does not introduce significant thermal stresses into the medium, that may cause defects in the device and affect the integrity of any subsequent layers. Additionally, during the utility and performance of the devices, possibilities for generation of thermal stresses are avoided, enhancing the utility of the devices.

BRIEF DESCRIPTION OF THE DRAWINGS

The invention is described in detail below in connection with the single FIGURE which is a view in elevation of a device constructed in according with the present invention. The layers may be made and applied to one another as further described in the Examples below.

DESCRIPTION OF THE INVENTION

Figure 1:
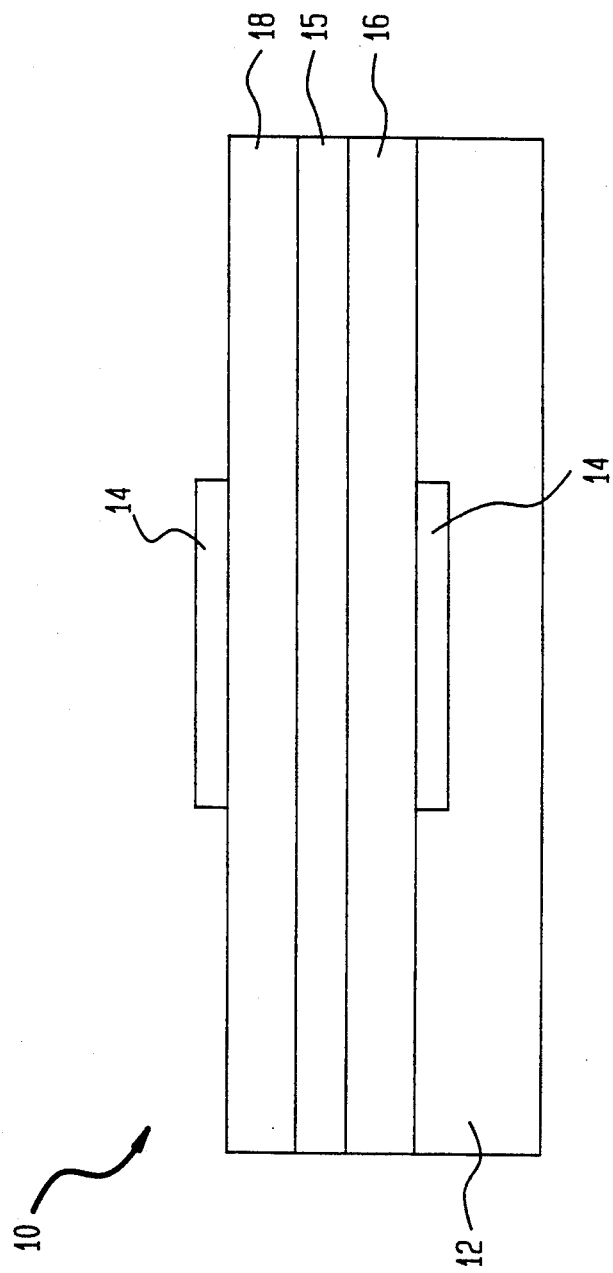

The invention provides for the fabrication of electrooptic waveguide devices by depositing a film or films of a polymeric nonlinear optical material on a substantially stress-free polymeric substrate whose thermal expansion coefficient matches that of the polymer layer or layers. The term "polymeric substrates" here refers to substrates that can be molded under substantially stress-free conditions from organic polymers. Processes for molding substrates from organic polymers under substantially stress-free conditions are well-known in the technologies related to, for example, injection molding, compression molding, and the like, particularly in the optical disc and compact disc industries.

Commercial molding technologies generally employ several kinds of polymer resins for molding substrates, such as, for example, polycarbonates, polyacrylates such as poly(methyl methacrylate), polysulfones, polyimides, polyarylates, thermotropic liquid crystal polymers, and the like. Some of these polymers are commercially available in pre-molded shapes such as wafers, discs, sheets, and the like. Examples include the Plexiglas ® sheets (from Rohm & Haas Company, Philadelphia, Pa.) of poly(methyl methacrylate). Polycarbonate optical disc substrates are available from the Laser-Video Company, Anaheim, California. Polycarbonate substrates are also available from Homalite Corporation, Wilmington, Del. The Durel ® polyarylate substrate and the Vectra ® thermotropic liquid crystal polymer substrate are available from Hoechst Celanese Corporation (Engineering Plastics Division, Chatham, N.J.). The Kapton ® substrates (available from E. I. duPont de Nemours & Co., Wilmington, Del.) are made of a polyimide. The Ulten ® substrate is available from Union Carbide Corporation, Bound Brook, New Jersey. Some of the above-mentioned substrates, such as, for example, the polycarbonate optical disc substrates from LaserVideo Company are sufficiently substantially stress-free for practicing the present invention.

If a pre molded commercially available polymer substrate is used to fabricate the electrooptic waveguide device of the invention, the substrate is generally checked for good optical qualities such as optical clarity, smoothness, flatness, temperature stability, and the like. Generally, a substrate that is sold and accepted in the industry for fabrication of optical discs and laser discs is acceptable for electrooptic waveguide device fabrication as well. If such a substrate is not readily available, substantially stress-free substrates may be molded according to the method described later in this Description and in the Examples.

The polymeric nonlinear optical material useful as guiding layer in the present invention can be chosen from a variety of such materials known in the literature. The polymer may be a main chain nonlinear optical polymer, or it may be a side chain nonlinear optical polymer. Several side chain polymers have good solubility in common organic solvents such as ketones, esters, and halogenated hydrocarbons, and therefore, are castable as films using common techniques such as spin-coating. Side chain polymers of the general structure in Formula 1

where P is a polymer main chain unit, S is a flexible spacer unit having a linear chain length between about 2-20 atoms, M is a pendant group which exhibits second order nonlinear optical susceptibility, and where the pendant chains consist of at least 25 percent of the polymers, and the polymer has a glass transition temperature of at least 40° C., may be used in the present invention. Several such polymers are known in the art.

For example, U.S. Pat. No. 4,865,430 discloses side chain nonlinear optical polymers of good solubility represented in Formula 2:

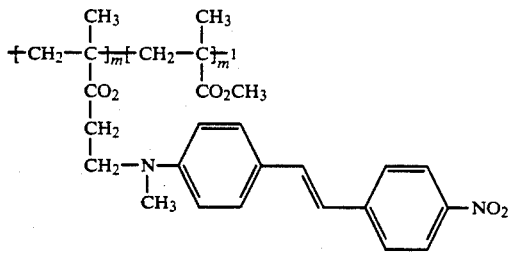

where m and $m^1$ are integers which total at least 10 with the m monomer comprising between about 10-90 mole percent of the total $(m+m^1)$ monomer units.

Additionally, several side chain nonlinear optical polymer films can be "poled" to enhance the overall nonlinear optical activity in the polymer film. Poling is a process whereby the dipoles of the individual nonlinear optical moieties in the polymer film are oriented by external forces, such as an electrical field, to be parallel to the field. Since nonlinear optical activity is a directional property, arising from the orientation of dipoles in the molecules, poling results in favorable parallel orientation of the dipoles in the polymer film, and hence in enhancement of the overall nonlinear optical activity.

In addition to the polymeric substrate and the nonlinear optical polymer layer, other layers may also be included in the device fabrication. In a polymeric electrooptic waveguiding device, the active guiding layer is a nonlinear optical polymer layer. Other layers that may be used in waveguide fabrication are, for example, a lower metal electrode layer, a lower cladding layer, an upper cladding layer, and an upper metal electrode layer. Furthermore, some of the steps in the fabrication process may involve the use of materials such as, for example, photoresists, which may be removed or etched away during subsequent steps of device fabrication.

The lower and upper electrode layers are thin films of a metal and are typically deposited by processes well known to those skilled in the art, such as, for example, vacuum deposition, electroplating, and the like. Any film-forming conducting metal may be used. Generally a metal, such as gold, is preferred due to its ease of deposition in film form by well established techniques.

The lower and upper cladding layers may be inorganics such as, for example, silicon nitride, silicon dioxide, and the like, or organic polymeric. Organic polymeric cladding layers are preferred for the instant invention. Several polymeric materials are available commercially that can be used as cladding layers, such as, for example, polyvinyl alcohols, polysiloxanes, polyethers, and the like. It is important, however, that the refractive index of the waveguiding layer is higher than and within about 0.005 of the refractive index of the cladding layers with which it is in coextensive proximity. U.S. Pat. No. 4,936,645 discloses polymeric cladding layers which are made up of a blend of organic nonlinear optical polymers. Such a blend of nonlinear optical polymers has particular utility in this regard, since its refractive index can be tailored by adjusting the nature and quantity of the individual components in the blend to satisfy the constraint in refractive index mentioned above. Additionally, the blend, being organic, may have sufficient solubility to enable casting by simple processes such as spin coating.

The present invention is described here as fabrication of an electrooptic channel waveguide device. A substrate of suitable size, shape and thickness may be cut out from, for example, a commercially available injection molded sheet of a suitable polymer, such as for example, a polycarbonate optical disc substrate supplied by LaserVideo Inc. When the substrate is not available commercially in a pre-molded desired shape, it may be injection molded from the polymer resin prior to fabrication of the waveguide device. For example, a wafer having a thickness of one millimeter, a length of five centimeters, and a width of 2.5 centimeters may be injection molded from a plastic resin such as the polycarbonate resin described above, the Ultem ® resin or the Durel ® resin by using a high speed injection molding machine such as, for example, the Technoplas Model No. SIM-5050C (available from Technoplas, USA, Inc., Columbus, Ohio).

Injection molding of the desired substrate must be done under substantially stress-free conditions. Precision stress-free molding may be achieved by techniques well known to those skilled in the art, such as, for example, injection molding in a substantially short time period, preferably in less than 1 second of melt injection time. Such very short injection times result in virtually no stress being present in the finished substrate due to the fact that the temperature of the material during the injection remains relatively constant.

Stress free molding is enhanced through very slow application of compression to the hot plastic when it is in the mold. While the amount of compression and the time over which it is applied will vary with different materials, satisfactory results have been achieved by applying pressure of about 150 tons/cm, over a period of about 30 seconds when using polycarbonate as the plastic with the molding temperature being about 190° C.

The following description of the fabrication of a channel waveguide utilizes a polycarbonate substrate. The substrate may be molded as above, or a commercially available substrate, or one that was cut from a commercially available large sheet, such as, for example, the Homalite annealed polycarbonate sheet may be used. The Homalite annealed polycarbonate sheet may be cut into a suitable size, for example, 3" diametric rounds. The cut rounds may be cleaned by processes known to those skilled in the art, such as, for example, ultrasonic cleaning or cleaning with solvents such as methanol which do not affect the integrity or the optical quality of the substrate. The substrate may then be dried in an oven under nitrogen at temperatures of about 30° C. to about 110° C. to remove any solvent and any volatiles, and then cooled to ambient temperature.

The surface of the polycarbonate may then be treated for improvement of adhesion by processes well known to those skilled in the art. A convenient method to improve adhesion is to subject the substrate to an oxygen plasma, for example, in a reactive ion etch chamber such as the Plasma-Fab 340 chamber (available from Electrotech, Inc., Hauppage, N.Y.).

An electrode layer may then be formed on the substrate. For example, a layer of chrome may first be deposited using an electron-beam vacuum evaporator to give a chrome thickness of about 2000-10,000 Angstroms, following which gold of thickness about 1,000-3,000 Angstroms may be deposited using the same equipment. The thickness of this gold layer may be increased to about 1-3 $\mu$m by electroplating using, for example, a non cyanide sulfite electroplating solution such as, for example, BDT-510 available from Sel-Rex OMI International, Inc., Nutley, N.J. If additional adhesion promotion is desired, this gold layer may then be further coated with about 100-1,000 Angstroms thick chrome layer using the vacuum evaporator such as the one described above.

The gold plated polycarbonate may then be spincoated with a lower cladding layer. Any polymeric cladding layer may be used. A suitable blend of polymers such as the one described in U.S. Pat. No. 4,936,645, referred to above may also be used. A suitable blend may be prepared by mixing, for example, two different copolymers, one being a 50:50 copolymer of 4-[N-(2-methacryloxyethyl)-N-methylamino]-4'-nitrostilbene and methyl methacrylate, and the other being a 35:65 copolymer of the same two respective monomers, in a 1:3 weight/weight ratio. The blend may be dissolved in a suitable solvent, such as, for example, cyclohexanone, to a suitable concentration and spincoated on the above substrate using, for example, a Solitec model 5100 spincoater (available from Solitec, Inc., Santa Clara, Calif.). For example, spincoating a 24 weight percent solution of the above blend at about 200-1,000 rpm for about 20-60 seconds followed by drying in an oven at about 140°-160° C. under nitrogen atmosphere gives a thickness of about 5-10 $\mu$m of cladding layer.

A masking layer of gold may then be deposited on the above lower cladding layer to about 800-1,500 Angstroms thickness by vacuum evaporation similar to, for example, the one described above.

Patterning of the waveguide may be done by techniques known in the art. For example, a positive photoresist such as the AZ-1518 brand photoresist (available from Hoechst Celanese Corporation, Electronic Chemicals Division, Branchburg, N.J.) may be spincoated on the gold layer at a speed of about 1,500-4,000 rpm for a period of about 30-120 seconds and baked in an oven at about 80°-100° C. for about 30-60 minutes to leave a thickness of about 1-2 $\mu$m of the photoresist layer. This may be exposed through a mask containing a pattern suitable for forming the desired channel waveguide pattern, and then developed to set the pattern on the gold. The gold in the exposed areas may then be etched away using etchants, such as, for example, the Type GE-6 gold etchant (from Acton Technologies, Pittston, Pa.) for a period of about 5-10 seconds. The remaining photoresist may then be removed by techniques known in the art, such as, for example, flood exposure to ultraviolet radiation followed by development, leaving behind the channel pattern.

The channel pattern is then etched into the lower cladding layer by known processes. For example, exposing the above patterned substrate to an oxygen plasma in a reactive ion etch chamber such as the one described above under suitable conditions of an oxygen plasma etch may etch a channel of about 2-4 $\mu$m depth into the lower cladding layer. This may be followed by removing the remaining gold on top by, for example, using the gold etchant referred to above.

If the pattern etched into the lower cladding layer has rough edges, those edges may be smoothened before depositing the waveguiding layer. The smoothening may be achieved, for example, by spincoating a very thin (about 1,500-4,000 Angstroms) layer of the blended copolymer used for forming the lower cladding layer.

A waveguiding layer may now be formed on the above construction. Any suitable nonlinear optical polymer that fits within the refractive index parameters mentioned above may be used. A preferred material is a 50:50 copolymer of 4-[N-(2-methacryloxyethyl)-N-methylamino]-4'-nitrostilbene and methyl methacrylate. This copolymer may be dissolved in a suitable solvent, such as, for example, cyclohexanone, to a suitable concentration, and spincoated on the above patterned substrate to give a thickness of, for example, about 4-5 $\mu$m in the waveguiding region and about 2-3 $\mu$m in the region away from the waveguiding region.

An upper cladding layer may then be deposited to a thickness of about 7-10 $\mu$m, by using, for example, the same blended copolymer and procedure as described above for the lower cladding layer.

An upper electrode layer may then be formed by processes known to those skilled in the art. A combination of vacuum deposition and electroplating is a convenient process. Thus, for example, a titanium layer of about 400-800 Angstroms thickness may be deposited first, followed by about 1,200-2,000 Angstroms thick gold layer, the deposition of both layers being achieved by, for example, vacuum evaporation as above. A photoresist such as the AZ-1518 photoresist referred to above may be used to create the suitable waveguide pattern, taking care to see that the areas that are to be electroded are exposed after the photoresist patterning. Electroplating, for example, by a process similar to that described above for the lower electrode layer, may lead to a gold layer of about 2-3 $\mu$m thickness of gold in the exposed areas. From the unexposed, unplated areas, the photoresist may be stripped by a process similar to that above. The titanium and the gold from the same areas may then be removed by, for example, using a titanium etchant and a gold etchant respectively. The channel waveguide thus obtained may be pigtailed and packaged as is known to those skilled in the art.

An embodiment of the present invention, namely the avoidance of thermal stresses by advantageously employing a polymeric substrate in electrooptic waveguide device fabrication instead of an inorganic substrate, was demonstrated as follows. An inorganic substrate, a silicon wafer, and a polymeric substrate, a polycarbonate disc, were selected for comparison, and were coated with a nonlinear optical polymer, the 50:50 copolymer mentioned above. The coating was done under identical conditions by spin coating. Both substrates were then subjected to the heating and cooling conditions described above. The polymer film on the silicon substrate visibly developed cracks and crazing, while the polycarbonate substrate remained smooth and clear of any cracks, crazing or similar defects. A second layer of the nonlinear optical polymer was then deposited on the polycarbonate substrate, which was then again subjected to the heating and cooling conditions described above. The coatings remained intact without any visible defects, demonstrating the superiority of the process of the present invention for fabricating superior electrooptic waveguide devices.

Similarly, another embodiment of the present invention was demonstrated by fabricating channel waveguides on a Homalite annealed polycarbonate substrate and a silicon wafer. The fabrication process was substantially similar to the one described above. The device that was built on the silicon substrate cracked and crazed during the operations, and the layers delaminated off the substrate at several places, making it unusable. The device that was built on polycarbonate, on the other hand, had no mechanical imperfections, and was fully functional.

The following examples are provided in order to further illustrate the present invention; however, the invention is no way limited thereby.

EXAMPLES

In the following Examples, g refers to grams, ml to milliliters, cc to cubic centimeters, °C. to degrees Celsius, °F. to degrees Fahrenheit, $\mu$m to micrometers, nm to nanometers, SCCM to Standard Cubic Centimeters per Minute, and "ambient temperature" to temperatures ranging between 20°-28° C.

EXAMPLE 1

Injection Molding of a Polycarbonate Substrate Under Stress-Free Conditions

Injection molding of a substrate under substantially stress-free conditions is described below in terms of injection molding a polycarbonate substrate suitable for the present invention. Makrolon CD-2005 polycarbonate resin (available from Mobay Chemicals, Pittsburgh, Pa.) was loaded into the hopper drier of a Technoplas SIM 5050C injection molding machine. The hopper drier temperature was maintained around 240°-260° F., and the temperature at the different sections of the barrel varied from about ambient temperature at the outer end to about 350° C. at the inner end. The polycarbonate resin was dried in the hopper and injection molded. The injection velocities ranged from about 5.0-20.0 cc per second at the different screw positions, while the mold temperatures varied from about 100°-110° C. The annular disc shaped substrates with outer diameter of about 130 cm, inner diameter of about 14 cm, and thickness of about 1.2 mm that were obtained from the process could be used in the fabrication of devices.

By employing a similar procedure, suitable stress-free substrates may be molded from other suitable resins such as the Ultem ® resin, the Vectra ® resin and the like.

EXAMPLE 2

Fabrication of a Mach-Zehnder Modulator (Indicated at 10 in FIG. 1) on a Polycarbonate Substrate (i) A 3 inch diameter round substrate (indicated at 12) was cut from a Homalite ® annealed polycarbonate sheet, and was then cleaned by washing with methanol and then dried by blowing off with dry nitrogen. The surface of the substrate was treated with an $O_2$ plasma for about 30 minutes in a Plasma-Fab 340 reactive-ion-etch chamber, using about 75 Watts r.f. power, an oxygen flow rate of about 5 SCCM's, about 10 mTorr total pressure, and a 40° C. substrate platten.

(ii) About 5000 Angstroms of chrome were deposited on the substrate by electron beam vacuum evaporation at the rate of about 5-10 Angstroms a second. The substrate was then allowed to cool down during about 15 minutes, and then about 1500 Angstroms of gold were deposited on the chrome at about the same rate and using the same process. The substrate was then electroplated using the non-cyanide sulfite elctroplating solution BDT 510, to increase the total gold layer thickness to about 2.5 $\mu$m. Another about 500 Angstroms of chrome were then vacuum evaporated on the gold layer as mentioned above.

(iii) Two copolymers of Formula 2, one containing the m and m monomers in about a 50:50 ratio, and the other containing the same monomers in about a 35:65 ratio, were blended in a 3:1 weight ratio respectively, and dissolved to about a 24 weight percent concentration in cyclohexanone. The solution was first filtered through glass fiber, then through a Gelman brand polytetrafluoroethylene (Teflon ®) membrane (1.0 $\mu$m pore size) and finally through a Gelman brand polytetrafluoroethylene (Teflon ®) membrane (0.2 $\mu$m pore size) under nitrogen atmosphere. This filtered solution was spin coated on the substrate in (ii) above at about 800 rpm for about 40 seconds. It was then baked in a nitrogen-purged oven at about 160° C. for about 4 hours, followed by bakes at about 135° C. for about 1 hour, and at about 110° C. for about 1 hour, and a slow relaxation back to room temperature, to give a polymer layer thickness of about 8 $\mu$m on the substrate.

(iv) A gold layer of about 1000 Angstroms thickness was deposited on the polymer layer in (iv) above by using the vacuum evaporation technique in (ii) above. AZ-1518 brand photoresist was spin coated on this at about 3000 rpm for about 30 seconds and it was baked in an air oven at about 90° C. for about 30 minutes to leave a photoresist layer of thickness 1.75 $\mu$m on gold. This was then exposed through a patterned mask to a Hg-Xe lamp of intensity about 20 mW/$c^2$ at about 405 nm for about 10 seconds in a Karl-Suss MJB-3 mask aligner (available from Karl-Suss, Waterbury Center, Vermont). The pattern was such that the mask was transparent in regions where the waveguide channel was to be formed. The pattern was developed by immersion in a 1:1 mixture of AZ-1:1 developer and water for about 45 seconds. It was then rinsed with de ionized water for about 5 minutes, and then dried in an air oven at about 110° C. for about 30 minutes.

(v) The substrate was then immersed in a Type GE-6 gold etchant for about 6 seconds to transfer the pattern in to the gold layer (indicated at 14), and then washed with de-ionized water for about 5 seconds. The remaining photoresist was removed by flood exposing the substrate to the same light source for about 10 seconds, followed by development in AZ-400K brand developer for about 15 seconds. The substrate was finally rinsed with deionized water. The substrate was then exposed to an $O_2$ plasma as in step (i) above using about 15 Watts of r.f. power, about 20 SCCM's of oxygen flow, about 190 mTorr total pressure, about 35° C. substrate platten, and about 20 minutes of etch time, to etch a channel about 2.5-3 $\mu$m deep. the gold was then removed by immersion in the gold etchant as described above, followed by rinsing in de-ionized water for about 5 minutes.

(vi) A 10 weight percent solution of the same blend of polymers as in (iii) above was made in cyclohexanone and filtered as above. It was then spin coated on the substrate, by first having about a 200 rpm spread cycle over about 5 seconds, and then spincoating at about 1300 rpm for about 20 seconds, and then dried as above to provide about a 3000 Angstroms thick lining layer of the polymer (indicated at 16).

(vii) A polymer of Formula 2 where the m and m monomers were present in about a 50:50 ratio was dissolved in cyclohexanone to about 23 weight percent solution and filtered as above. The filtered solution was spin coated on the substrate, by first having about a 200 rpm spread cycle for about 5 seconds, and then spin coating at about 1600 rpm for about 30 seconds. The film was baked as in (iii) to form a film (indicated at 15) of about 2.5 $\mu$m thickness away from the waveguiding region, and about 4.5 $\mu$m thickness in the waveguiding region.

(ix) An upper cladding layer (indicated at 18) of about 8 $\mu$m thickness was then formed as in (iii) above using the same blend of polymers as in (iii). Then about a 500 Angstroms thick layer of titanium was deposited on the upper cladding layer by vacuum evaporation as before. This was followed by about a 1500 Angstroms thick gold layer deposited similarly.

(x) AZ-1518 brand photoresist was spin coated on the gold at about 300 rpm for about 30 seconds, followed by baking and suitably patterning and developing as in (iv) above, to leave exposed those areas that would be electroded. It was then electroplated as in (ii) to deposit about 2.5 $\mu$m thick gold layer (indicated at 14). The photoresist was then removed similar to (v) above, following which the gold and titanium were removed from the unplated regions by first dipping in the gold etchant as in (v) above, and then in a titanium etchant, such as, for example, the TFT etchant supplied by Transene, Inc., Rowley, Mass. The modulator was then rinsed in de-ionized water and dried, ready for pigtailing and packaging.

EXAMPLE 3

Comparative Example. Attempt to Build the Device of Example 2 on a Silicon Substrate A silicon wafer (3 inches in diameter) was chosen as the substrate material instead of the polycarbonate substrate of Example 2. Attempt was made to build a Mach-Zehnder modulator device on the silicon substrate by using substantially the same process as outlined in Example 2 with no success. The layers cracked and crazed during the various steps. In addition, the layers delaminated off the substrate at several spots, making the device unusable, thus demonstrating the superiority of the process of using the substantially stress-free polymeric substrates of the invention for device fabrication.

What is claimed is:

1. An electrooptic waveguiding device which comprises a substantially stress-free substrate of an organic polymer, a first polymeric cladding layer on said substrate, a waveguiding layer on said first polymeric cladding layer, and a second polymeric cladding layer on said waveguiding layer, said waveguiding layer and said first and said second polymeric cladding layers comprising a nonlinear optical polymer, wherein said stress-free substrate of organic polymer possesses thermal expansion coefficient substantially close to the thermal expansion coefficients of said cladding layers and of said waveguiding layer.

2. An electrooptic waveguiding device as described in claim 1, wherein said waveguiding layer exhibits second order nonlinear optical susceptibility.

3. An electrooptic waveguiding device as described in claim 1, wherein said organic polymer substrate comprises polycarbonate.

4. An electrooptic waveguiding device as described in claim 1, wherein said organic polymer substrate comprises poly(methyl methacrylate).

5. An electrooptic waveguiding device as described in claim 1, wherein said organic polymer substrate comprises a polysulfone.

6. An electrooptic waveguiding device as described in claim 1, wherein said organic polymer substrate comprises a polyimide.

7. An electrooptic waveguiding device as described in claim 1, wherein said substrate is formed by an injection-molding process.

8. An electrooptic waveguiding device as described in claim 1, wherein said substrate is formed by a compression molding process.

9. An electrooptic waveguiding device as described in claim 1, wherein said first and said second cladding layers comprise a homogeneous blend of at least two nonlinear optical polymers.

10. An electrooptic waveguiding device as described in claim 1, wherein the refractive index of said first and said second polymeric cladding layers is less than, and within about 0.005 of, the refractive index of said waveguiding layer.

11. An electrooptic waveguiding device as described in claim 1, wherein said waveguiding layer and said first and said second cladding layers comprise a side chain nonlinear optical polymer characterized by a recurring monomeric unit corresponding to the formula:

where P is a polymer main chain unit, S is a flexible spacer unit having a linear chain length between about 2-20 atoms, M is a pendant group which exhibits second order nonlinear optical susceptibility, and where the pendant side chains consist of at least 25 percent of the polymers, and the polymer has a glass transition temperature of at least 40° C.

12. An electrooptic waveguiding device as described in claim 11, wherein the M group in the formula contains a stilbene structure.

13. An electrooptic waveguiding device as described in claim 11, wherein the M group in the formula contains an azobenzene structure.

14. An electrooptic waveguiding device as described in claim 11, wherein the M group in the formula contains an electron donor moiety, said electron donor moiety being selected from the group consisting of

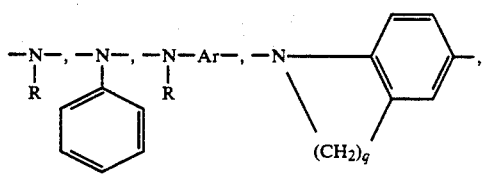

—O—, —S—, with R being a hydrogen or a C1–C4 alkyl, q being 2–3, and Ar being

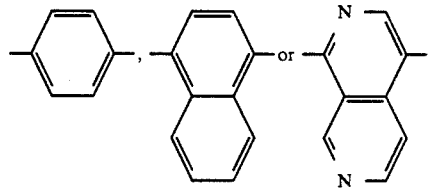

15. An electrooptic waveguiding device as described in claim 11, wherein the M group in the formula contains an electron acceptor moiety, said electron acceptor moiety being selected from the group consisting of C(CN)2, C(H)(CN), C(H)(NO2), C(H)(CF3), C(H)(SO2CH3), and C(H)(SO2CF3).

16. An electrooptic waveguiding device as described in claim 11, wherein said waveguiding layer and said first and second cladding layers are deposited by a spin coating process.

17. A method of fabricating an electrooptic waveguiding device, comprising the steps of:
(a) forming a substantially stress-free substrate of an organic polymer;
(b) forming a thin film metal electrode layer on said substrate;
(c) forming a first polymeric cladding layer in coextensive proximity with said metal electrode;
(d) forming a polymeric waveguiding layer in contact with said first cladding layer;
(e) forming a second polymeric cladding layer in contact with said waveguiding layer; and
(f) forming a second thin film metal electrode layer in contact with said second cladding layer,
wherein said waveguiding layer and said first and said second polymeric cladding layers comprise a nonlinear optical polymer, and wherein said stress-free substrate of organic polymer possesses thermal expansion coefficient substantially close to the thermal expansion coefficients of said cladding layers and of said waveguiding layer.

18. A passive waveguiding device which comprises a substantially stress-free substrate of an organic polymer, a first polymeric cladding layer on said organic polymer substrate, a waveguiding layer on said first polymeric cladding layer, and a second polymeric cladding layer on said waveguiding layer, wherein said stress-free substrate of organic polymer and said cladding layers and said waveguiding layer possess substantially the same thermal expansion coefficient.

19. A method of fabricating a passive waveguide, comprising the steps of:
(a) forming a substantially stress-free substrate of an organic polymer;
(b) forming a first polymeric cladding layer in coextensive proximity with said substrate;
(c) forming a polymeric waveguiding layer in contact with said first cladding layer; and
(d) forming a second polymeric cladding layer in contact with said waveguiding layer, wherein said stress-free substrate of organic polymer and said cladding layers and said waveguiding layer possess substantially the same thermal expansion coefficient.

* * * * *